United States Patent
Park et al.

(10) Patent No.: US 11,994,697 B2
(45) Date of Patent: May 28, 2024

(54) DISPLAY DEVICE AND METHOD OF MANUFACTURING THE SAME

(71) Applicant: SAMSUNG DISPLAY CO., LTD., Yongin-si (KR)

(72) Inventors: Jeong Woo Park, Yongin-si (KR); Jae Joong Kwon, Suwon-si (KR); Beom Shik Kim, Seoul (KR); Young Sang Ha, Suwon-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 128 days.

(21) Appl. No.: 17/494,967

(22) Filed: Oct. 6, 2021

(65) Prior Publication Data
US 2022/0197054 A1    Jun. 23, 2022

(30) Foreign Application Priority Data
Dec. 18, 2020    (KR) ........................ 10-2020-0178206

(51) Int. Cl.
*G02B 30/36*    (2020.01)
*G02B 27/42*    (2006.01)

(52) U.S. Cl.
CPC ......... *G02B 30/36* (2020.01); *G02B 27/4255* (2013.01)

(58) Field of Classification Search
CPC ........ G02B 30/26; G02B 30/36; G02B 30/29; G02B 30/27; G02B 30/30; G02B 30/32; G02B 27/4255; G03B 21/602; H04N 13/302; H04N 13/305; H04N 13/31; H04N 13/317; G06T 15/00; B32B 38/1833; B32B 38/1858; B32B 38/18; B32B 2457/20;
(Continued)

(56) References Cited

U.S. PATENT DOCUMENTS 8,968,499 B2 * 3/2015 Hiroya ................ B32B 38/1841
156/379
2009/0310216 A1 * 12/2009 Roh ........................ G02B 30/25
359/465
(Continued)

FOREIGN PATENT DOCUMENTS

KR    2015-0074452    7/2015
KR    10-1925459    12/2018

*Primary Examiner* — Stephone B Allen
*Assistant Examiner* — Jyotsna V Dabbi
(74) *Attorney, Agent, or Firm* — F. Chau & Associates, LLC

(57) ABSTRACT

A display device includes: a display panel including an active region, an inactive region disposed adjacent to the active region, and a first alignment mark, wherein a plurality of sub-pixels are disposed in the active region, and the first alignment mark is positioned at a first distance in a first direction from an alignment reference pixel disposed adjacent to a boundary of the active region; and an optical member including a plurality of lenses and a second alignment mark, wherein the plurality of lenses are disposed to be inclined at a first angle with respect to a direction in which the plurality of sub-pixels are arranged, and wherein the second alignment mark is positioned at the first distance in the first direction from the alignment reference pixel and is positioned at a second distance in a second direction, crossing the first direction, from the first alignment mark.

17 Claims, 15 Drawing Sheets

(58) Field of Classification Search
CPC ............... B32B 41/00; B32B 2041/04; Y10T 156/1744
USPC ........................................................ 359/462
See application file for complete search history.

(56) References Cited

U.S. PATENT DOCUMENTS

| | | | |
|---|---|---|---|
| 2010/0026993 A1* | 2/2010 | Kim | G01M 11/0221 356/124 |
| 2011/0164318 A1* | 7/2011 | Jung | H04N 13/317 359/625 |
| 2017/0371170 A1* | 12/2017 | Cui | G02B 7/003 |

* cited by examiner

LAF: BS, LS, AM_L

DISPLAY DEVICE AND METHOD OF MANUFACTURING THE SAME

CROSS-REFERENCE TO RELATED APPLICATION

This application claims priority under 35 U.S.C. § 119 to Korean Patent Application No. 10-2020-0178206 filed on Dec. 18, 2020 in the Korean Intellectual Property Office, the disclosure of which is incorporated by reference herein in its entirety.

TECHNICAL FIELD

The present invention relates to a display device and a method of manufacturing the same.

DISCUSSION OF THE RELATED ART

With the progression of the information society, desires for a display device displaying an image are increasing in various forms. Accordingly, recently, various display devices such as a liquid crystal display (LCD) device, a plasma display panel (PDP) device, an organic light-emitting diode (OLED) display device, and the like are being used.

Recently, a stereoscopic image display device and a viewing angle control display device have been under development. Generally, the stereoscopic image display device and the viewing angle control display device display an image that is divided and displayed in a space in front of the display device using an optical member. The stereoscopic image display device, typically, separates and displays a left-eye image and a right-eye image to give a stereoscopic effect according to binocular parallax. The viewing angle control display device, typically, separates and displays an image of a first viewing angle and an image of a second viewing angle so that users positioned at different viewing angles may see different images from the display device.

SUMMARY

According to an embodiment of the present invention, a display device includes: a display panel including an active region, an inactive region disposed adjacent to the active region, and a first alignment mark, wherein a plurality of sub-pixels are disposed in the active region, and the first alignment mark is positioned at a first distance in a first direction from an alignment reference pixel disposed adjacent to a boundary of the active region; and an optical member including a plurality of lenses and a second alignment mark, wherein the plurality of lenses are disposed to be inclined at a first angle with respect to a direction in which the plurality of sub-pixels are arranged, and wherein the second alignment mark is positioned at the first distance in the first direction from the alignment reference pixel and is positioned at a second distance in a second direction, crossing the first direction, from the first alignment mark.

In an embodiment of the present invention, the display device provides N viewpoints for providing a stereoscopic image, and the alignment reference pixel is a sub-pixel, among the plurality of sub-pixels, that displays an image for a (N+1)/2th viewpoint, wherein "N" is a natural number.

In an embodiment of the present invention, the optical member includes a base member including a first region and a second region, wherein the plurality of lenses are disposed in the first region, wherein the plurality of lenses are not disposed in the second region, and wherein the second alignment mark is disposed in the second region of the base member.

In an embodiment of the present invention, the second distance is larger than a preset error range, and the preset error range is a distance from a center line that bisects a lens of the plurality of lenses in an extension direction of the lens of the plurality of lenses to a center of the alignment reference pixel.

In an embodiment of the present invention, the second distance is larger than a width of the sub-pixel.

In an embodiment of the present invention, the second alignment mark is disposed on the plurality of lenses.

In an embodiment of the present invention, the second alignment mark is disposed on a lens, among the plurality of lenses, overlapping the alignment reference pixel.

In an embodiment of the present invention, the first alignment mark is disposed in the inactive region.

In an embodiment of the present invention, the first alignment mark is electrically connected to the alignment reference pixel.

In an embodiment of the present invention, the first alignment mark is a pad for driving the alignment reference pixel.

In an embodiment of the present invention, the second distance is determined by the first distance and the first angle.

In an embodiment of the present invention, the first distance and the second distance are measured based on a center of the alignment reference pixel, a center of the first alignment mark, and a center of the second alignment mark.

In an embodiment of the present invention, the first alignment mark does not overlap the second alignment mark in a thickness direction.

In an embodiment of the present invention, at least a part of the first alignment mark overlaps at least a part of the second alignment mark in a thickness direction.

According to an embodiment of the present invention, a method of manufacturing a display device includes: arranging a first alignment mark of a display panel and a second alignment mark of an optical member to overlap each other in a thickness direction; and moving at least one of the display panel or the optical member based on a first distance from a first alignment reference pixel to the first alignment mark, wherein the first alignment reference pixel provides a specific viewpoint among a plurality of viewpoints.

In an embodiment of the present invention, the moving of at least one of the display panel or the optical member includes misaligning a center of the first alignment mark with a center of the second alignment mark by a second distance.

In an embodiment of the present invention, the first distance is a distance measured in a first direction, and the second distance is a distance measured in a second direction crossing the first direction.

In an embodiment of the present invention, the second distance is larger than a preset error range, and the preset error range is a distance from a center line that bisects a lens of the optical member in an extension direction of the lens to a center of the first alignment reference pixel.

In an embodiment of the present invention, the first alignment reference pixel is a sub-pixel, among a plurality of sub-pixels, that displays an image for a (N+1)/2th viewpoint, wherein the plurality of sub-pixels display N view images corresponding to N viewpoints, respectively, wherein "N" is a natural number.

In an embodiment of the present invention, the method further includes bonding the display panel and the optical member to each other.

BRIEF DESCRIPTION OF THE DRAWINGS

The above and other features of the present invention will become more apparent by describing in detail embodiments thereof with reference to the attached drawings, in which.

DETAILED DESCRIPTION OF THE EMBODIMENTS

Figure 1:
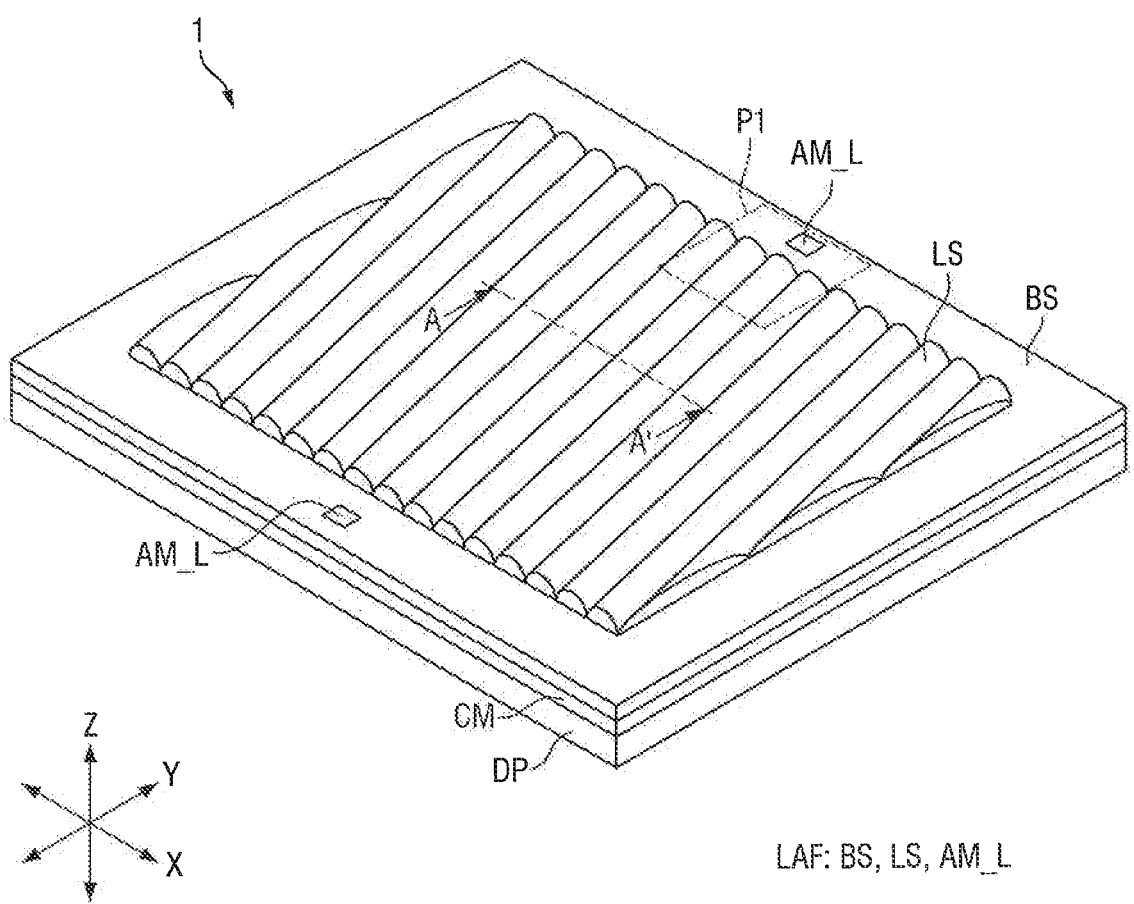
FIG. 1 is a perspective view of a display device according to an embodiment of the present invention.

The present invention will now be described more fully hereinafter with reference to the accompanying drawings. This invention may, however, be embodied in different forms and should not be construed as limited to the embodiments set forth herein. The same reference numbers may indicate the same components throughout the specification. In the attached figures, the thickness of layers and regions may be exaggerated for clarity. In other words, since sizes and thicknesses of components in the drawings may be exaggerated for clarity, the following embodiments of the present invention are not limited thereto.

It will also be understood that when a layer is referred to as being "on" another layer or substrate, it can be directly on the other layer or substrate, or intervening layers may be present. In contrast, when an element is referred to as being "directly on" another element, there are no intervening elements present.

Hereinafter, embodiments of the present invention will be described with reference to the accompanying drawings.

Figure 2:
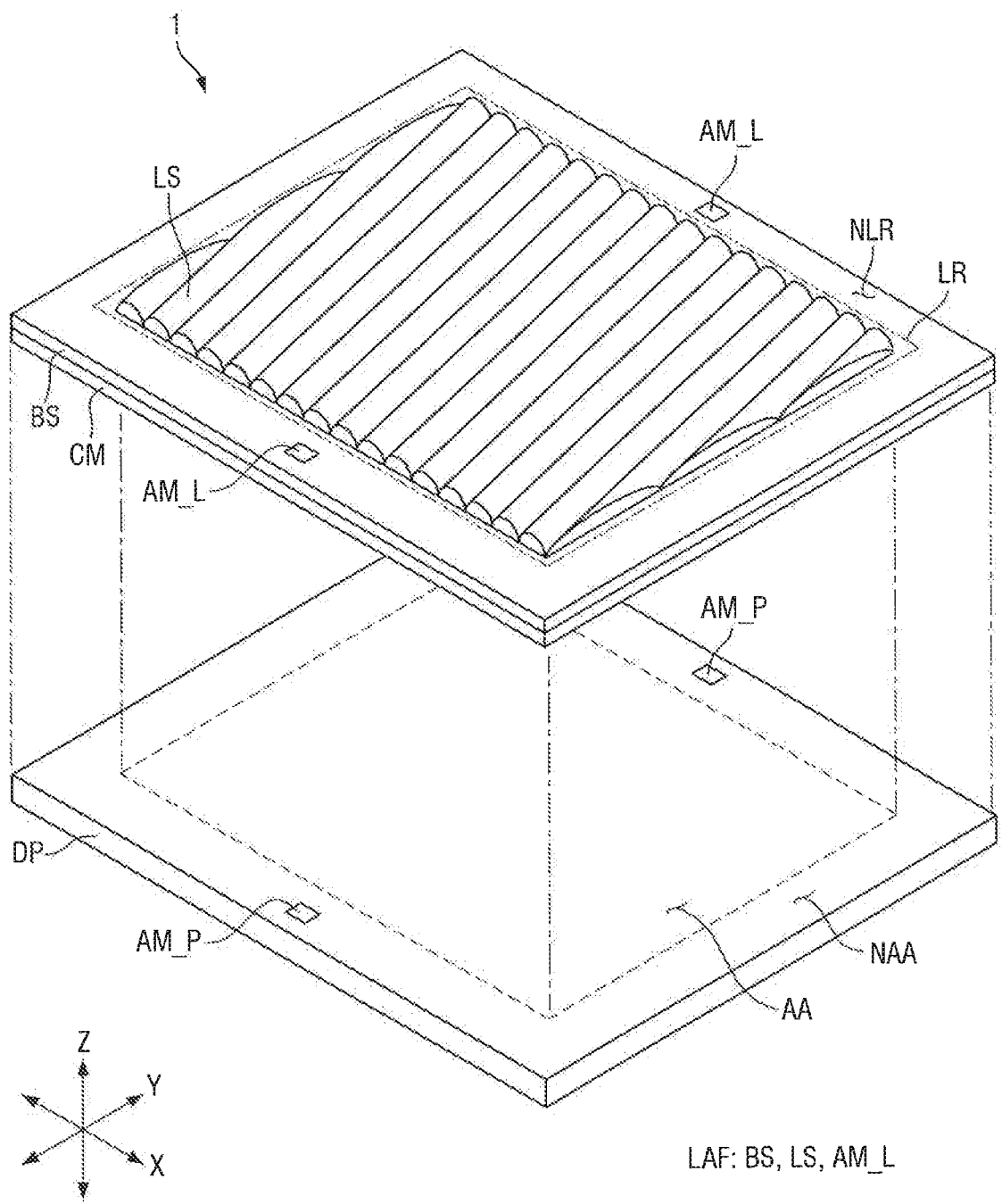
FIG. 2 is an exploded perspective view of the display device according to an embodiment of the present invention.

FIG. 1 is a perspective view of a display device according to an embodiment of the present invention. FIG. 2 is an exploded perspective view of the display device according to an embodiment of the present invention.

Hereinafter, a first direction X, a second direction Y, and a third direction Z cross in different directions from each other. In an embodiment of the present invention, the first direction X may be a lateral direction, and the second direction Y may be a lateral direction. Further, the third direction Z may be substantially perpendicular to the first direction X and the second direction Y, and may be a thickness direction. The first direction X, the second direction Y and/or the third direction Z may include two or more directions. For example, the third direction Z may include an upper direction toward an upper side of the drawing and a lower direction toward a lower side of the drawing. In this case, one surface of a member facing the upper direction may be referred to as an upper surface, and the other surface of the member facing the lower direction may be referred to as a lower surface. However, the directions are illustrative and relative, and are not limited to those mentioned above.

A display device 1 below may be a stereoscopic image display device. The stereoscopic image display device may separate an image and display a left-eye image and a right-eye image in a space in front of the display device 1 to give a stereoscopic effect due to binocular parallax. Further, the stereoscopic image display device may separate and provide a plurality of viewing angle images in the space in front of the display device 1 to display different images for each of a plurality of different viewing angles.

The stereoscopic image display device may include a light field display device in which a member such as a barrier or a lenticular lens LS is disposed on a display panel DP so that different pieces of image information from each other are input to both eyes of a viewer.

The light field display device may generate a light field by the display panel DP and a three-dimensional optical system to create a stereoscopic image. As will be described later, light rays generated from each pixel of the display panel DP of the light field display device may form a light field directed in a specific direction (e.g., a specific viewing angle and/or a specific viewpoint) by a lens, a pinhole, a barrier, or the like, and accordingly, stereoscopic image information corresponding to the specific direction may be provided to the viewer.

Referring to FIG. 1, the display device 1 may include the display panel DP and an optical member LAF.

The display panel DP may be a light-emitting display panel including a light-emitting element. For example, the display panel DP may include an organic light-emitting display panel using an organic light-emitting diode including an organic emission layer, a micro-LED display panel using a Micro LED, a quantum dot light-emitting display panel using a quantum dot light-emitting diode including a quantum dot emission layer, or an inorganic light-emitting display panel using an inorganic light-emitting element including an inorganic semiconductor, but the present invention is not limited thereto.

The display panel DP may have a rectangular shape on a plane. The display panel DP may have a long side in the first direction X and a short side in the second direction Y. For example, a corner in which the long side of the first direction X and the short side of the second direction Y meet may be formed to be rounded to have a predetermined curvature or may be formed at a right angle. A planar shape of the display panel DP is not limited to a quadrangle, and may be formed similar to other polygons, a circle, or an ellipse.

The display panel DP may include an active region AA and an inactive region NAA disposed around the active region AA.

The active region AA may be a region in which a video and/or an image is displayed, and the inactive region NAA may be a region in which the video and/or the image is not displayed. The active region AA may be a region in which a plurality of pixels (see "PX" in FIG. 3) are disposed, and the inactive region NAA may be a region in which the plurality of pixels (see "PX" in FIG. 3) are not disposed.

The inactive region NAA may be disposed around the active region AA to at least partially surround at least a part of the active region AA. For example, the active region AA may have an approximately rectangular shape in a plan view, and the inactive region NAA may have a rectangular shape, with an opening, surrounding four-side edges of the active region AA. However, the present invention is not limited thereto, and the inactive region NAA may be disposed to surround only a portion of the active region AA.

The display panel DP may further include a first alignment mark AM_P.

The first alignment mark AM_P may be disposed in the inactive region NAA of the display panel DP. The first alignment mark AM_P may include, for example, metal. The first alignment mark AM_P may include a structure such as a pad, a wiring, an integrated circuit, or the like disposed in the inactive region NAA. The structure may include all components disposed in the inactive region NAA and spaced apart from an alignment reference pixel SPX_R' by a first distance D1 in the second direction Y.

The optical member LAF may be disposed on an upper surface of the display panel DP. The upper surface of the display panel DP may be a surface positioned to face in a direction in which a video and/or an image is displayed, and a lower surface of the display panel DP may be a surface opposite to the upper surface of the display panel DP. The upper and lower surfaces of the display panel DP may refer to front and rear surfaces of the display panel DP, respectively.

The optical member LAF may include a base member BS, a plurality of lenses LS, and a second alignment mark AM_L.

The base member BS may be disposed on the display panel DP. For example, the base member BS may be disposed on the upper surface of the display panel DP. For example, the base member BS may include a film-type member having a small thickness.

The base member BS may be disposed on the active region AA and the inactive region NAA of the display panel DP. For example, the base member BS may overlap the active region AA and the inactive region NAA of the display panel DP in the thickness direction to cover the active region AA and the inactive region NAA. However, the present invention is not limited thereto, and the base member BS may cover the active region AA, and may be disposed so as to cover only a portion of the inactive region NAA.

The plurality of lenses LS may be disposed on the base member BS. For example, the plurality of lenses LS may be disposed on an upper surface of the base member BS. In an embodiment of the present invention, the plurality of lenses LS may be disposed to cover only a portion of the upper surface of the base member BS.

For example, the upper surface of the base member BS may be divided into a first region LR, in which the plurality of lenses LS are disposed, and a second region NLR, in which the plurality of lenses LS are not disposed. The first region LR may have an approximately rectangular shape in a plan view, and the second region NLR may be disposed to at least partially surround at least a part of an edge of the first region LR.

The first region LR and the second region NLR may overlap the active region AA and the inactive region NAA in the thickness direction, respectively. In an embodiment of the present invention, the first region LR and the second region NLR may have substantially the same area as the active region AA and the inactive region NAA in a plan view, respectively, and the first region LR and the second region NLR may completely overlap the active region AA and the inactive region NAA, respectively; however, the present invention is not limited thereto. In other words, a boundary between the first region LR and the second region NLR and a boundary between the active region AA and the inactive region NAA may be aligned to overlap each other in the thickness direction. However, the present invention is not limited thereto, and the first region LR and the second region NLR may have different areas from the active region AA and the inactive region NAA in a plan view, respectively, so that a portion of the first region LR may overlap the inactive region NAA, or a portion of the second region NLR may overlap the active region AA.

The plurality of lenses LS may be arranged at regular intervals to form a lens array. The plurality of lenses LS may be slanted lenses inclined in the first direction X and the second direction Y in a plan view. Each of the lenses LS may extend in one side direction crossing the first direction X and the second direction Y in a plan view, and the plurality of lenses LS may be arranged in the other side direction which crosses and/or is orthogonal to the one side direction in a plan view. The one side direction and the other side direction may be referred to as a fourth direction and a fifth direction, respectively. For example, the plurality of lens LS may extend in a direction that is diagonal with respect to the first direction X and the second direction Y, and may be arranged along the first direction X.

As will be described later, the first direction X and the second direction Y may be directions in which a plurality of sub-pixels (see "SP1, SP2, and SP3" in FIG. 3) are arranged. As shown in FIG. 4, in a plan view, the first direction X may be a lateral direction and/or a direction in which rows of the plurality of sub-pixels (see "SP1, SP2, and SP3" in FIG. 3) extend, and the second direction Y may be a longitudinal direction and/or a direction in which columns of the plurality of sub-pixels (see "SP1, SP2, and SP3" in FIG. 3) extend.

However, the first direction X and the second direction Y are examples, and are not limited to the above. For example, the first direction X may be a longitudinal direction and/or a direction in which columns of the plurality of sub-pixels (see "SP1, SP2, and SP3" in FIG. 3) extend, and the second direction Y may be a lateral direction and/or a direction in which rows of the plurality of sub-pixels (see "SP1, SP2, and SP3" in FIG. 3) extend.

Each of the lenses LS may be a lenticular lens LS having an approximately semi-cylindrical shape, and the optical member LAF may be a lenticular lens LS array film. In addition, the optical member LAF may include a Fresnel lens LS.

The second alignment mark AM_L may be disposed in the second region NLR of a base member BS. The second alignment mark AM_L may overlap the inactive region NAA in the thickness direction. In an embodiment of the present invention, the base member BS may have both long sides in the first direction X and both short sides in the second direction Y in a plan view, and two second alignment marks AM_L may be disposed adjacent to both long sides of the base member BS, respectively. For example, each of the second alignment marks AM_L may be positioned in a middle portion of a portion of the second region NLR extending in the first direction X between the long side of the base member BS and the plurality of lenses LS, and the two second alignment marks AM_L may be aligned on a virtual line extending in the second direction Y and that bisects both long sides of the base member BS. For example, the second alignment marks AM_L may be aligned with each other. However, a position of the second alignment mark AM_L is not limited thereto, and the second alignment mark AM may be positioned at corners or short sides of the base member BS and a region adjacent thereto.

The first alignment mark AM_P and the second alignment mark AM_L may provide a reference for aligning the display panel DP with the optical member LAF when the display panel DP and the optical member LAF are being bonded together. The first alignment mark AM_P and the second alignment mark AM_L will be described later with further reference to FIG. 4 below.

The display device 1 may further include a coupling member CM. The coupling member CM may be interposed between the display panel DP and the optical member LAF to bond the display panel DP and the optical member LAF together. The coupling member CM may be optically transparent. For example, the coupling member CM may include an optical transparent adhesive or an optical transparent resin.

Figure 3:
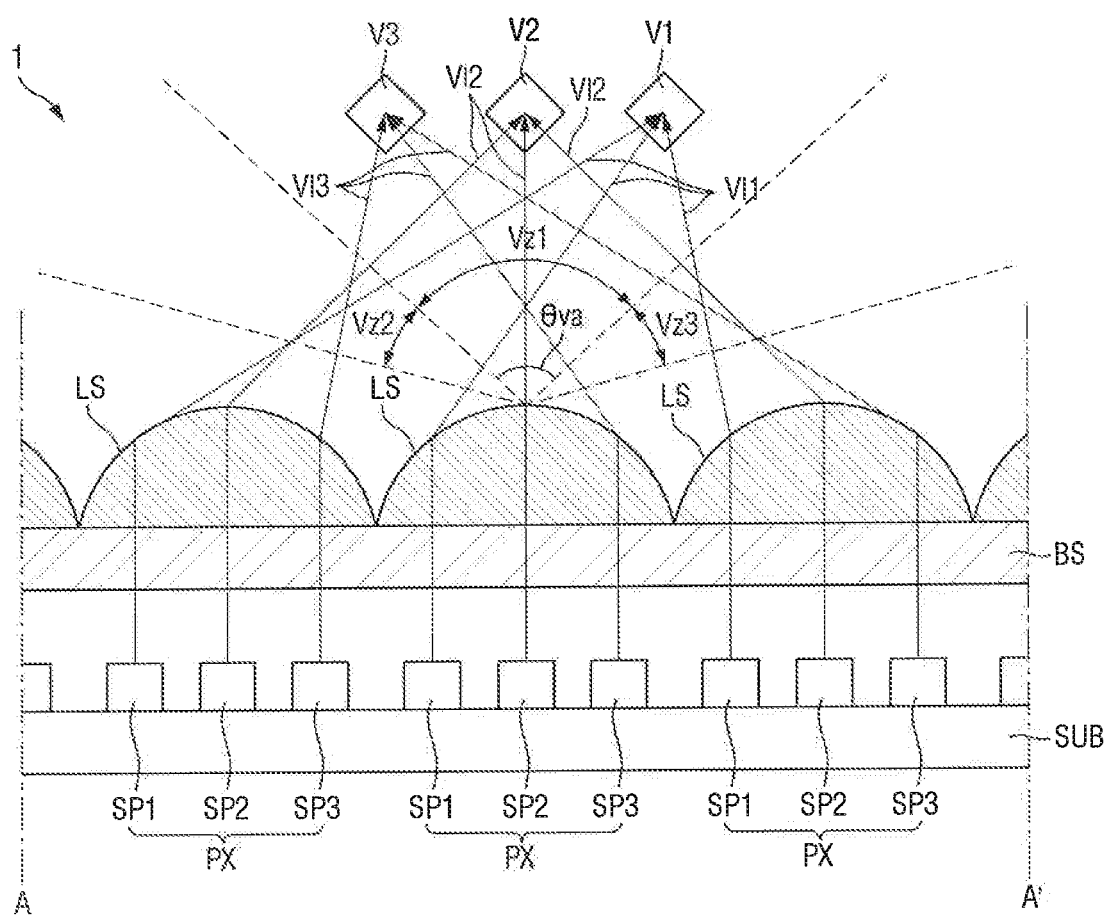
FIG. 3 is a cross-sectional view taken along line A-A' in FIG. 1.
Figure 4:
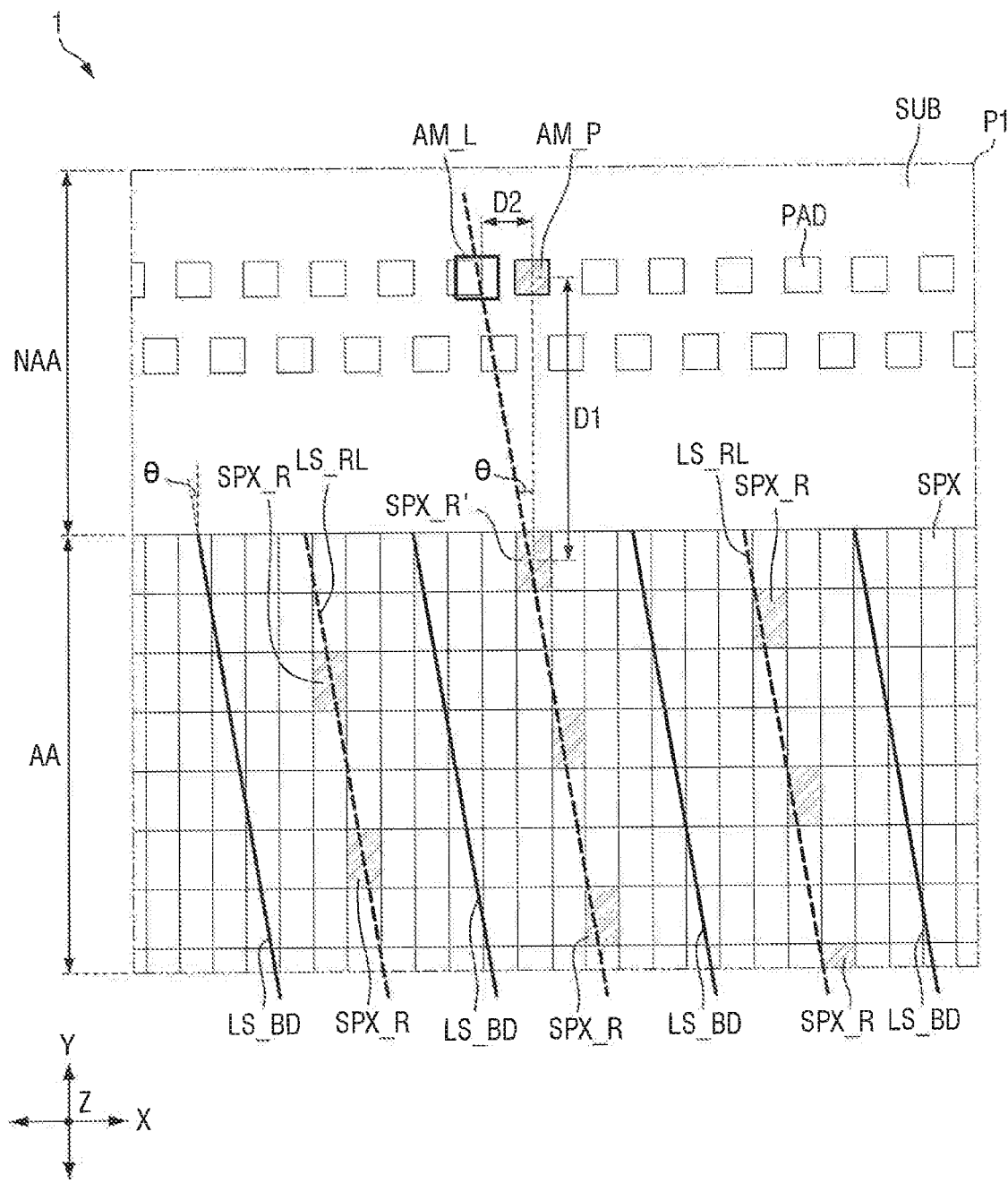
FIG. 4 is an enlarged plan view of portion "P1" in FIG. 1.

FIG. 3 is a cross-sectional view taken along line A-A' in FIG. 1.

FIG. 3 conceptually illustrates a method of implementing a stereoscopic image and viewing angle control of the display device 1.

In FIG. 3, for convenience of description, only three pixels PX and three lenses LS of the display panel DP are shown, but the number of pixels PX and the number of lenses LS are not limited thereto.

Referring to FIG. 3, the display panel DP may include a substrate SUB and a plurality of pixels PX disposed on the substrate SUB.

The substrate SUB may include an organic polymer material such as polyethylene, polyimide, polycarbonate, polysulfone, polyacrylate, polystyrene, polyvinyl chloride, polyvinyl alcohol, polynorbomene, or polyester.

The plurality of pixels PX may be disposed on one surface facing the optical member LAF of the substrate SUB.

Each pixel PX may include a group of sub-pixels SP1, SP2, and SP3 for expressing white gradation. Each of the sub-pixels SP1, SP2, and SP3 may be a minimum unit capable of expressing a gradation. In FIG. 3, for convenience of description, three sub-pixels SP1, SP2, and SP3 are shown, but the number of sub-pixels SP1, SP2, and SP3 is not limited thereto.

Each of the sub-pixels SP1, SP2, and SP3 may emit one among light of a first color, light of a second color, and light of a third color. For example, the first color may be red, the second color may be green, and the third color may be blue, but the present invention is not limited thereto. The pixel PX may further include a sub-pixel emitting white light.

In FIG. 3, three sub-pixels SP1, SP2, and SP3 per one lens LS, are disposed to overlap in the thickness direction a lens LS, but the number of the sub-pixels SP1, SP2, and SP3 overlapping one lens LS is not limited thereto.

The pixel may include a first sub-pixel SP1, a second sub-pixel SP2, and a third sub-pixel SP3.

A plurality of first sub-pixels SP1 are disposed adjacent to a first side of each lens LS, a plurality of second sub-pixels SP2 are disposed in a center of each lens LS, and a plurality of third sub-pixels SP3 may be disposed adjacent to a second side of each lens LS. For example, the plurality of second sub-pixels SP2 may be disposed between the plurality of first sub-pixels SP1 and the plurality of second sub-pixels SP2. For example, as shown in FIG. 3, the first side and the second side may refer to a left side and a right side of the lens LS, respectively, in a cross-sectional view.

The plurality of first sub-pixels SP1, the plurality of second sub-pixels SP2, and the plurality of third sub-pixels SP3 may provide a first view image VI1, a second view image VI2, and a third view image VI3, respectively.

The first view image VI1 displayed by the plurality of first sub-pixels SP1, the second view image VI2 displayed by the plurality of second sub-pixels SP2, and the third view image VI3 displayed by the plurality of third sub-pixels SP3 may be displayed in spaces separated from each other on the front surface of the display device 1.

The first view image VI1, the second view image VI2, and the third view image VI3 may be refracted by the plurality of lenses LS to be provided to a first viewpoint V1, a second viewpoint V2, and a third viewpoint V3, respectively. For example, as shown in FIG. 3, the second viewpoint V2 may be positioned in a central region of the display device 1, and the first viewpoint V1 may be positioned in a right region of the display device 1. Further, the third viewpoint V3 may be positioned in a left region of the display device 1.

The first view image VI1, the second view image VI2, and the third view image VI3 may be images generated in consideration of binocular parallax. When the left eye and the right eye of a user are respectively positioned at different viewpoints among the first viewpoint V1, the second viewpoint V2, and the third viewpoint V3, the user may feel a stereoscopic effect according to the binocular parallax.

The display device 1 may include a plurality of viewing zones VZ1, VZ2, and VZ3. The viewing zones VZ1, VZ2, and VZ3 may refer to a region in which one stereoscopic image may be viewed naturally, without interruption, within a range of a specific viewing angle θva. For example, the plurality of viewing zones VZ1, VZ2, and VZ3 may include a first viewing zone VZ1 positioned in the central region of the display device 1, a second viewing zone VZ2 positioned in the left region of the display device 1, and a third viewing zone VZ3 positioned in the right region of the display device 1.

Each of the first viewing zone VZ1, the second viewing zone VZ2, and the third viewing zone VZ3 may provide different images. For example, the first viewing zone VZ1, the second viewing zone VZ2, and the third viewing zone VZ3 may respectively provide an image of an object viewed in a first viewing angle range, a second viewing angle range, and a third viewing angle range, which are different from each other. In another example, the first viewing zone VZ1, the second viewing zone VZ2, and the third viewing zone VZ3 may provide a navigation image, an image displaying vehicle information, and an entertainment image such as a movie, respectively.

The first viewpoint V1, the second viewpoint V2, and the third viewpoint V3 may constitute at least a part of a plurality of viewpoints in the first viewing zone VZ1. For example, when there are N viewpoints in the first viewing zone VZ1, the first viewpoint V1 may be a first viewpoint positioned at the leftmost position of the first viewing zone VZ1, the third viewpoint V3 may be an Nth viewpoint positioned at the rightmost position of the first viewing zone VZ1, and the second viewpoint V2 may be a (N+1)/2th viewpoint positioned at the centermost position of the first viewing zone VZ1 and between the first viewpoint V1 and the second viewpoint V2. "N" may be a natural number.

In this case, the second viewpoint V2 may be a viewpoint viewed from a position facing the display device 1 to form an angle of about 90° with the upper surface (e.g., front surface) of the display device 1. For example, the second viewpoint V2 may be a viewpoint when the display device 1 is viewed vertically downward, in a cross-sectional view.

The second viewpoint V2 may serve as a reference for aligning the display device 1 and the optical member LAF. As described later, the display device 1 and the optical member LAF may be aligned using a plurality of second sub-pixels providing the second viewpoint V2.

In addition, for convenience of description, although it is illustrated in FIG. 3 that the first sub-pixel SP1, the second sub-pixel SP2, and the third sub-pixel SP3 respectively provide three view images VI1, VI2, and VI3 to three viewpoints V1, V2, and V3, respectively, the present invention is not limited thereto. The display device 1 may further include a plurality of sub-pixels SP1, SP2, and SP3 providing additional view images, viewpoints, and/or viewing zones in addition to the view images VI1, VI2, and VI3, the viewpoints V1, V2, and V3, and the viewing zones VZ1, VZ2, and VZ3 illustrated in FIG. 3. For example, the number of the sub-pixels SP1, SP2, and SP3, view images VI1, VI2, and VI3, viewpoints V1, V2, and V3, and viewing zones VZ1, VZ2, and VZ3 may vary depending on the design of the display device 1.

FIG. 4 is an enlarged plan view of portion "P1" in FIG. 1.

For convenience of description, the illustration of the base member BS in FIG. 4 may be omitted, and the lens LS is illustrated to be transparent.

Referring to FIGS. 1 to 4, the plurality of sub-pixels SP1, SP2, and SP3 may be disposed on the substrate SUB of the display panel DP. The plurality of sub-pixels SP1, SP2, and SP3 may be disposed in the active region AA of the display panel DP. In an embodiment of the present invention, the plurality of sub-pixels SP1, SP2, and SP3 may be disposed in a matrix form having a row in the first direction X and a column in the second direction Y, but the present invention is not limited thereto. For example, the plurality of sub-pixels SP1, SP2, and SP3 may also be arranged in a diagonal direction crossing the first direction X and the second direction Y to have a rhombic shape and/or a diamond shape in a plan view. For example, an arrangement manner of the plurality of sub-pixels SP1, SP2, and SP3 may be variously varied.

The plurality of lenses LS may be disposed on the display panel DP, and may be disposed to overlap the active region AA of the display panel DP in the thickness direction. The plurality of lenses LS may be disposed in the active region AA of the display panel DP in a plan view.

As described above, each of the lenses LS may extend in parallel to each other in one side direction crossing the first direction X and the second direction Y in a plan view, and the plurality of lenses LS may be arranged in the other side direction crossing the one side direction. The one side direction may be a direction inclined at a first angle θ with respect to the second direction Y, and the other side direction may be orthogonal to the one side direction. As described above, the second direction Y may be a direction in which columns of the plurality of sub-pixels SP1, SP2, and SP3 extend.

In this case, lens boundaries LS_BD between the lenses LS of the plurality of lenses LS and a center line LS_RL disposed between the lens boundaries LS_BD may extend in parallel to each other in the one side direction in a plan view.

A distance between neighboring lens boundaries LS_BD may be substantially the same as a pitch at which the plurality of lenses LS are arranged. The distance between the neighboring lens boundaries LS_BD may refer to the shortest distance between the neighboring lens boundaries LS_BD.

For example, the pitch at which the plurality of lenses LS are arranged may be substantially the same as a width of each lens LS in the other side direction. For example, the pitch may be larger than a width of the sub-pixel. For example, the pitch may be about 5 times to 8 times the width of the sub-pixel, but the present invention is not limited thereto. The distance, the pitch, and the width may be measured in the other side direction, or may be measured in the first direction X.

The center line LS_RL may be a virtual line bisecting each lens LS in one side direction in a plan view. The center line LS_RL may be disposed to be spaced apart from the neighboring lens boundaries LS_BD by the same distance between the neighboring lens boundaries LS_BD. A distance that the center line LS_RL is spaced apart from the lens boundary LS_BD may be substantially the same as half of the pitch at which the plurality of lenses LS are arranged. The center line LS_RL may refer to a central region of the lens LS extending in the one side direction in a plan view and may be spaced apart from the neighboring lens boundaries LS_BD by the same distance.

As shown in FIG. 3, the lens boundary LS_BD refers to a portion (e.g., a region) of the lens LS in which a thickness of the lens LS is smallest in a cross-sectional view, and the center line LS_RL may be disposed to overlap a portion of the lens LS in which the thickness of the lens LS is greatest from a cross-sectional view, but the present invention is not limited thereto. For example, each lens LS may have a semi-circular shape from a cross-sectional view.

The lens boundary LS_BD and the center line LS_RL may extend to form the first angle θ with the second direction Y. Referring to FIGS. 1, 2, and 4, the second direction Y may be a direction in which an edge of the display device 1 (display panel DP) extends and/or a direction in which the plurality of sub-pixels SP1, SP2, and SP3 are arranged. The first angle θ may be greater than about 0° and less than about 90°. For example, the first angle θ may be greater than about 5° and less than about 15°, but the present invention is not limited thereto.

Referring further to FIG. 3, the plurality of sub-pixels SP1, SP2, and SP3 may include a plurality of reference viewpoint pixels SPX_R.

The reference viewpoint pixel SPX_R may be a sub-pixel providing a specific viewing zone VZ1, VZ2, or VZ3, a specific view image and/or a specific viewpoint among the plurality of sub-pixels SP1, SP2, and SP3. In an embodiment of the present invention, the reference viewpoint pixel SPX_R may be a second sub-pixel that provides the second viewpoint V2 (second view image). As described above, the second viewpoint V2 may be the (N+1)/2th viewpoint among the N viewpoints.

The plurality of reference viewpoint pixels SPX_R may be disposed to respectively overlap the center line LS_RL of each lens LS in a plan view. In this case, the center line LS_RL may or may not pass a center of each of the reference viewpoint pixels SPX_R. In this case, a distance between the center line LS_RL and the center of the reference viewpoint pixel SPX_R may be less than or equal to half of a width of the reference viewpoint pixel SPX_R in the first direction X and/or the other side direction. For example, the distance between the center line LS_RL and the center of the reference viewpoint pixel SPX_R may be about 5 μm, but the present invention is not limited thereto.

The reference viewpoint pixels SPX_R disposed in one lens LS may be arranged to be spaced apart from each other in one side direction along the center line LS_RL. The spacing between the plurality of reference viewpoint pixels SPX_R overlapping one center line LS_RL may be constant or irregular.

For example, in a plan view, a distance in the first direction X and/or the other side direction between the reference viewpoint pixel SPX_R disposed in a first lens LS and the reference viewpoint pixel SPX_R disposed in a neighboring second lens LS may be almost constant. The distance in the first direction X and/or the distance in the other side direction may be substantially the same as the pitch at which the plurality of lenses LS are arranged. For example, the distance between the reference viewpoint pixel SPX_R disposed in the first lens LS and the reference viewpoint pixel SPX_R disposed in the neighboring second lens LS may be about 50 μm to about 70 μm, but the present invention is not limited thereto.

As shown in FIG. 4, at least a part of the plurality of reference viewpoint pixels SPX_R disposed in one lens LS and at least a part of the plurality of reference viewpoint pixels SPX_R disposed in the neighboring lens LS may be disposed in different columns from each other in a plan view. At least one of the plurality of reference viewpoint pixels SPX_R disposed in one lens LS may be disposed in the same column as the reference viewpoint pixel SPX_R disposed in the neighboring lens LS in a plan view.

As shown in FIG. 4, at least one of the plurality of reference viewpoint pixels SPX_R disposed in one lens LS may be disposed in a row different from another reference viewpoint pixel SPX_R disposed in the neighboring lens LS in a plan view. At least one of the plurality of reference viewpoint pixels SPX_R disposed in one lens LS may be disposed in the same row as the reference viewpoint pixel SPX_R disposed in the neighboring lens LS in a plan view.

The reference viewpoint pixel SPX_R may be positioned within a preset error range from the center line LS_RL. The error range may be measured based on the center and/or boundary of the reference viewpoint pixel SPX_R. For example, a width of each of the plurality of sub-pixels SP1, SP2, and SP3 in the first direction X may be about 10 μm, and the error range may be about 5 μm or less, but the present invention is not limited thereto.

The plurality of reference viewpoint pixels SPX_R may include at least one alignment reference pixel SPX_R'.

The alignment reference pixel SPX_R', among the plurality of reference viewpoint pixels SPX_R, may be a reference viewpoint pixel SPX_R disposed adjacent to a boundary of the active region AA. The alignment reference pixel SPX_R' may be a reference viewpoint pixel SPX_R, among the plurality of reference viewpoint pixels SPX_R, disposed closest to a boundary between the active region AA and the inactive region NAA. In FIG. 4, the alignment reference pixel SPX_R' may be positioned in a row disposed adjacent to the boundary of the active region AA, but the present invention is not limited thereto. For example, the row or column in which the alignment reference pixel SPX_R' is positioned may be spaced apart by at least one row or column from the boundary between the active region AA and the inactive region NAA.

As described above, the first alignment mark AM_P may be positioned in the inactive region NAA of the display panel DP. The second alignment mark AM_L may be positioned in the second region NLR of the optical member LAF.

The first alignment mark AM_P and the second alignment mark AM_L may have a square shape in a plan view. In this case, the second alignment mark AM_L may be disposed in an annular shape surrounding an edge of the second alignment mark AM_L with a transparent rectangular shape. However, the present invention is not limited thereto. The first alignment mark AM_P and the second alignment mark AM_L may each have various shapes such as a rectangular shape, a rhombic shape, a triangle shape, a cross shape, a circular shape, or an elliptical shape.

A size of the second alignment mark AM_L in a plan view may be larger than that of the first alignment mark AM_P, but the present invention is not limited thereto. The size of the second alignment mark AM_L may be less than or equal to that of the first alignment mark AM_P.

The first alignment mark AM_P may be positioned at the first distance D1 from a boundary of the active region AA. For example, the first alignment mark AM_P may be positioned at the first distance D1 in the first direction X from the alignment reference pixel SPX_R'. The first alignment mark AM_P may be disposed to be spaced apart from the alignment reference pixel SPX_R' by the first distance D1. The first distance D1 may be measured based on a center of the alignment reference pixel SPX_R' and a center of the first alignment mark AM_P, but the present invention is not limited thereto. The first distance D1 may be measured based on an edge of the first alignment mark AM_P and an edge of the alignment reference pixel SPX_R'. The first direction X may be a direction in which rows of the plurality of sub-pixels SP1, SP2, and SP3 extend.

The first alignment mark AM_P may be formed in the inactive region NAA, and for example, at least one of configurations for driving the display panel DP may include the first alignment mark AM_P disposed in the inactive region NAA.

For example, the first alignment mark AM_P may be a structure such as a wiring, a pad, an integrated circuit, a dam, a bank, or boundaries of an organic/inorganic layer disposed in the inactive region NAA. For example, the first alignment mark AM_P may be a pad, among a plurality of pads disposed in the inactive region NAA of the display panel DP, electrically connected to the alignment reference pixel SPX_R' and the sub-pixels for driving the alignment reference pixel SPX_R' and the sub-pixels disposed in the same column as the alignment reference pixel SPX_R', but the present invention is not limited thereto. The pad, among the plurality of pads disposed in the inactive region NAA, may be a pad positioned at the first distance D1 in the second direction Y from the alignment reference pixel SPX_R'.

The second alignment mark AM_L may be positioned at the first distance D1 in the second direction Y from the alignment reference pixel SPX_R', and may be positioned at a second distance D2 in the first direction X from the first alignment mark AM_P. The second alignment mark AM_L may be spaced apart from the alignment reference pixel SPX_R' by the first distance D1, and may be spaced apart from the first alignment mark AM_P by the second distance D2.

The first distance D1 and the second distance D2 may be measured based on the center of the alignment reference pixel SPX_R', the center of the first alignment mark AM_P, and a center of the second alignment mark AM_L, but the present invention is not limited thereto. The second distance D2 may be measured based on edges of the first alignment mark AM_P and the second alignment mark AM_L. The second direction Y may be a direction in which columns of the plurality of sub-pixels SP1, SP2, and SP3 extend. As the second alignment mark AM_L is disposed in the second region NLR, the second alignment mark AM_L may be recognized without distortion compared to a case in which the second alignment mark AM_L is disposed on the lens LS.

The second distance D2 may be larger than a preset error range to be described later. The second distance D2 may be larger than the width of the sub-pixel SPX. The width may be a width in the first direction X or a width in the second direction Y.

The second distance D2 may be smaller than the first distance D1. However, the present invention is not limited thereto, and the second distance D2 may be equal to or greater than the first distance D1 according to the first angle θ.

Positions of the first alignment mark AM_P and the second alignment mark AM_L may be determined based on the first distance D1, the second distance D2, and the first angle θ. For example, the first distance D1 and the second distance D2 may satisfy the following relationship.

$$D2 = D1 \times \tan \theta$$

In FIG. 4, the first alignment mark AM_P and the second alignment mark AM_L may be disposed to not overlap each other in the thickness direction, but the present invention is not limited thereto. For example, the centers of the first alignment mark AM_P and the second alignment mark AM_L may be spaced apart by the second distance D2 from each other, and a part of the first alignment mark AM_P and a part of the second alignment mark AM_L may also overlap each other in the thickness direction.

The second distance D2 may be formed due to the movement of the optical member LAF during a bonding process. As will be described later in a method of manufacturing a display device below, in the display device 1 according to an embodiment of the present invention, the plurality of sub-pixels SP1, SP2, and SP3 of the display panel DP and the plurality of lenses LS of the optical member LAF may be aligned with relatively high precision by applying the first alignment mark AM_P and the second alignment mark AM_L, so that a manufacturing process and a manufacturing time may be reduced, and a high-quality stereoscopic image may be provided.

Figure 5:
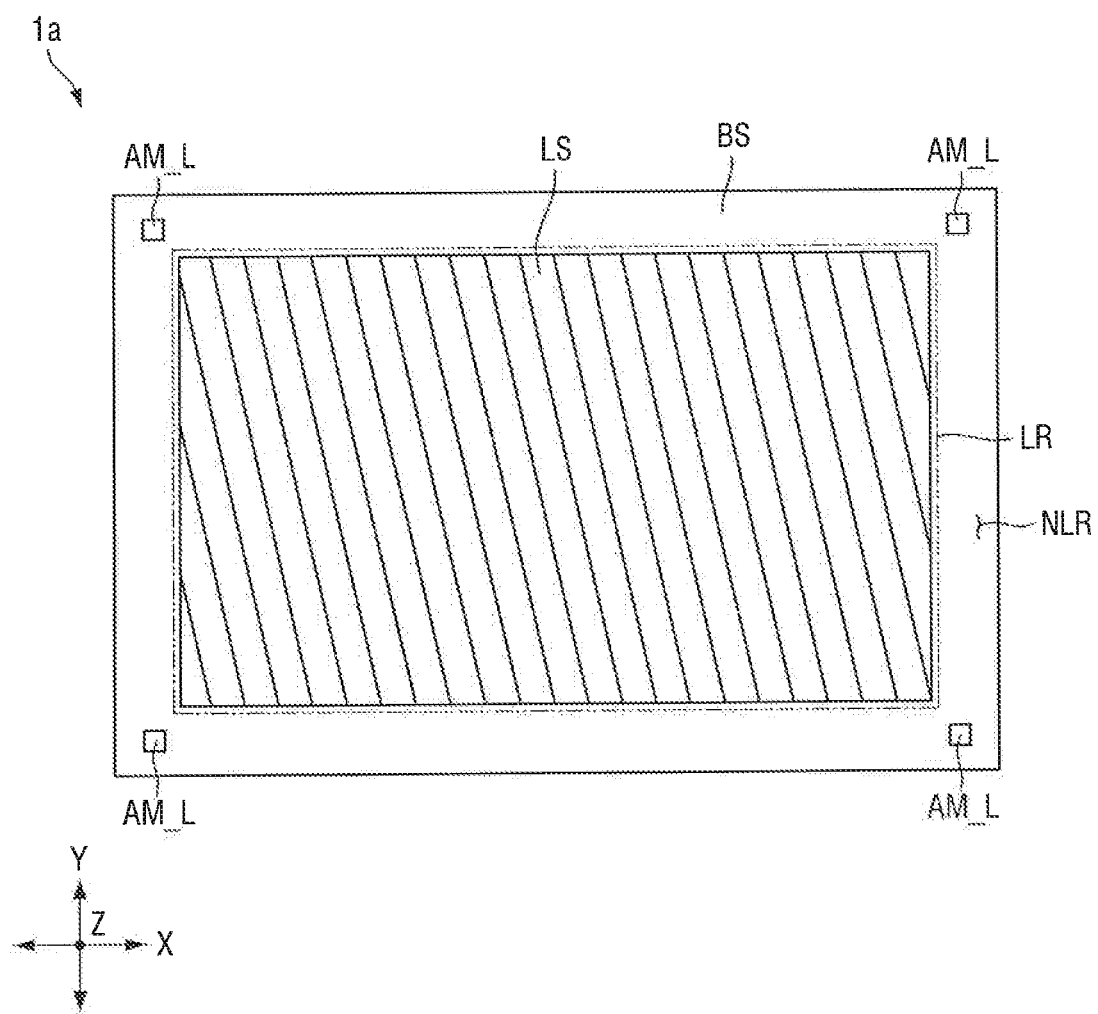
FIG. 5 is a plan view of a display device according to an embodiment of the present invention.
Figure 6:
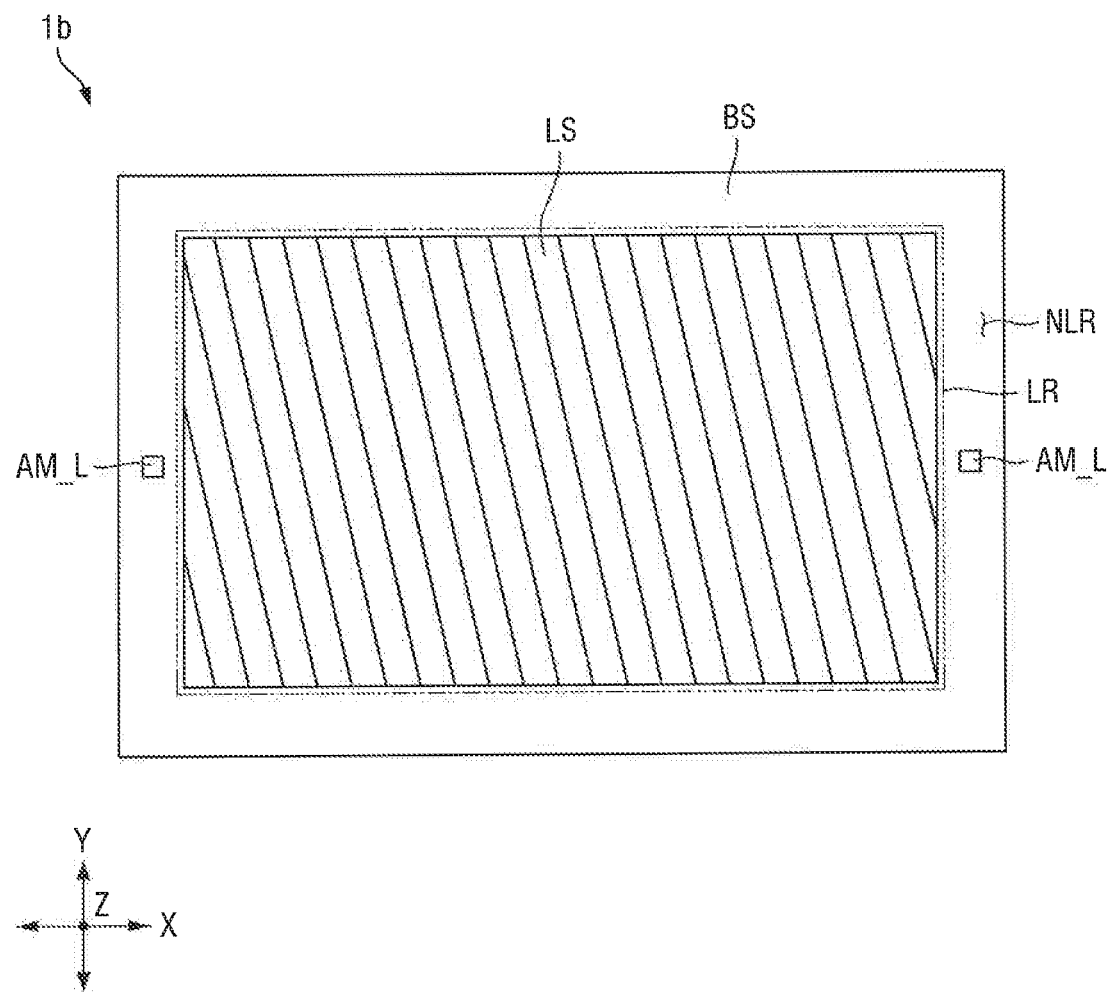
FIG. 6 is a plan view of a display device according to an embodiment of the present invention.
Figure 7:
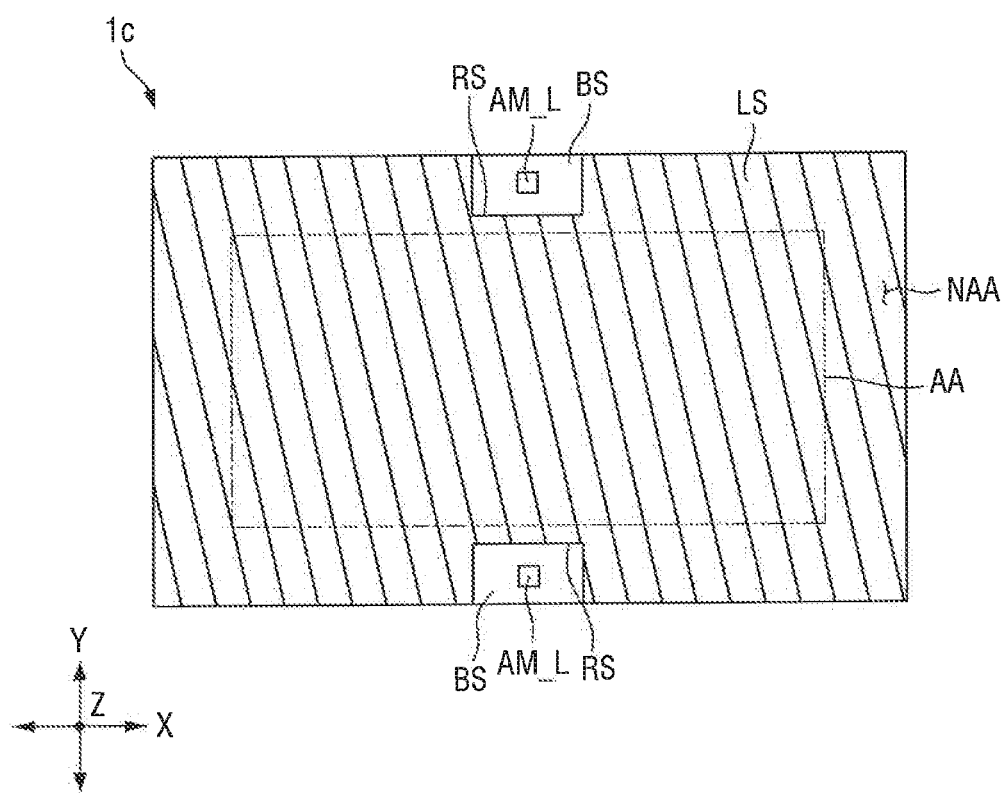
FIG. 7 is a plan view of a display device according to an embodiment of the present invention.

FIG. 5 is a plan view of a display device according to an embodiment of the present invention. FIG. 6 is a plan view of a display device according to an embodiment of the present invention. FIG. 7 is a plan view of a display device according to an embodiment of the present invention.

In FIGS. 1 and 2, two second alignment marks AM_L are disposed on the display device 1, for example, both long sides of the base member BS in the first direction X, but the present invention is not limited thereto. As shown in FIGS. 5 to 7, the position of the second alignment mark AM_L may vary.

For example, as shown in FIG. 5, the second alignment mark AM_L may be disposed in the second region NLR in a plan view, and may be disposed at corner portions of the optical member LAF (e.g., the base member BS). The corner portions may refer to corner portions of a display device 1a. The corner portions may be formed by connecting long sides extending in the first direction X and short sides extending in the second direction Y.

A plurality of second alignment marks AM_L may be disposed at least two or more of four corners of the optical member LAF, respectively. For example, as shown in FIG. 5, four second alignment marks AM_L may be disposed at four corners, respectively, but the present invention is not limited thereto. For example, the second alignment mark AM_L may also be disposed on the long side of the optical member LAF in the first direction X and/or the short side in the second direction Y. In an embodiment of the present invention, a plurality of second alignment marks AM_L may be disposed at each of the four corners of the optical member LAF.

In another example, as shown in FIG. 6, two second alignment marks AM_L may be positioned in the second region NLR, and may be respectively positioned on both short sides of the optical member LAF in the second direction Y. Each second alignment mark AM_L may be positioned between the plurality of lenses LS and the short side extending in the second direction Y in a plan view. For example, the second alignment mark AM_L may be positioned at a center portion of the short side. For example, the two second alignment marks AM_L may be disposed on a virtual line vertically bisecting both short sides. For example, the two second alignment marks AM_L may be aligned with each other.

In another example, as shown in FIG. 7, the plurality of second alignment marks AM_L may be positioned in a plurality of recessed portions RS formed in the plurality of lenses LS in a plan view, respectively. The recessed portion RS may be formed by retreating a part of the plurality of lens boundaries LS_BD aligned with an edge of the display panel DP (e.g., the base member BS), in a plan view, toward a center of the display device 1. In other words, the recessed portion RS may be formed by removing at least a part of the plurality of lenses LS overlapping the inactive region NAA. The base member BS in the recessed portion RS may be exposed without being covered by the plurality of lenses LS in a plan view.

The embodiments of FIGS. 5 to 7 are substantially the same as or similar to the embodiments of FIGS. 1 to 4 except for the arrangement of the second alignment mark AM_L, and thus redundant descriptions will be omitted below.

Figure 8:
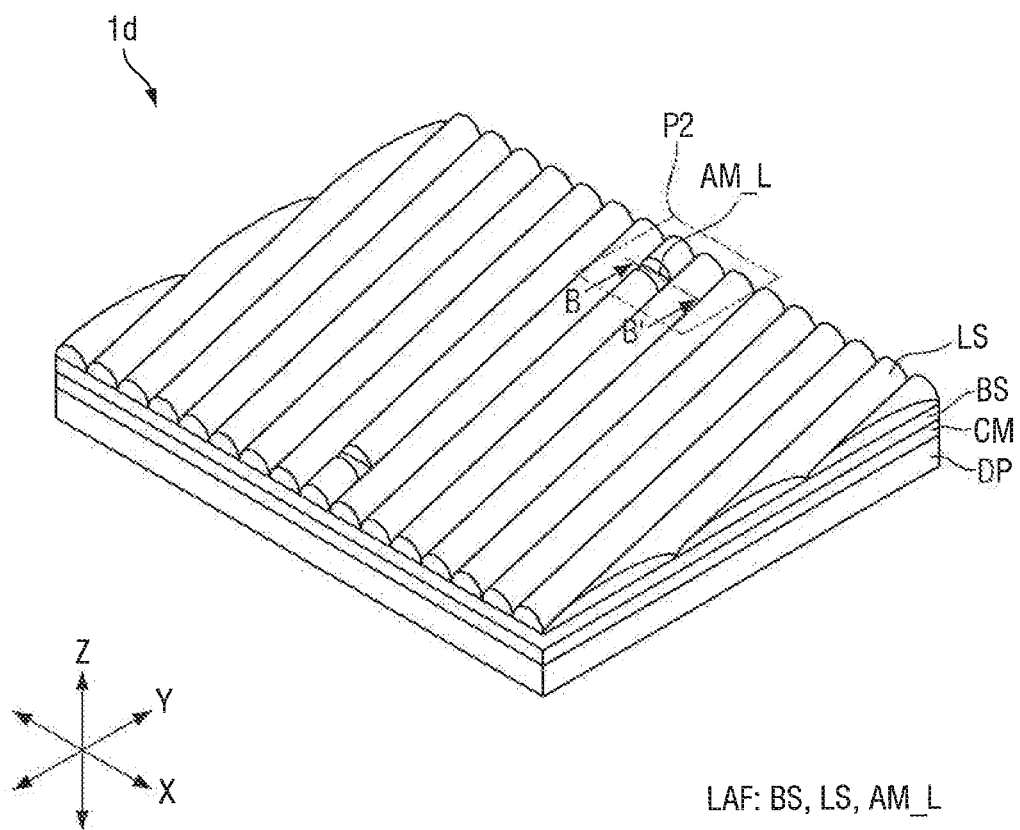
FIG. 8 is a perspective view of a display device according to an embodiment of the present invention.
Figure 9:
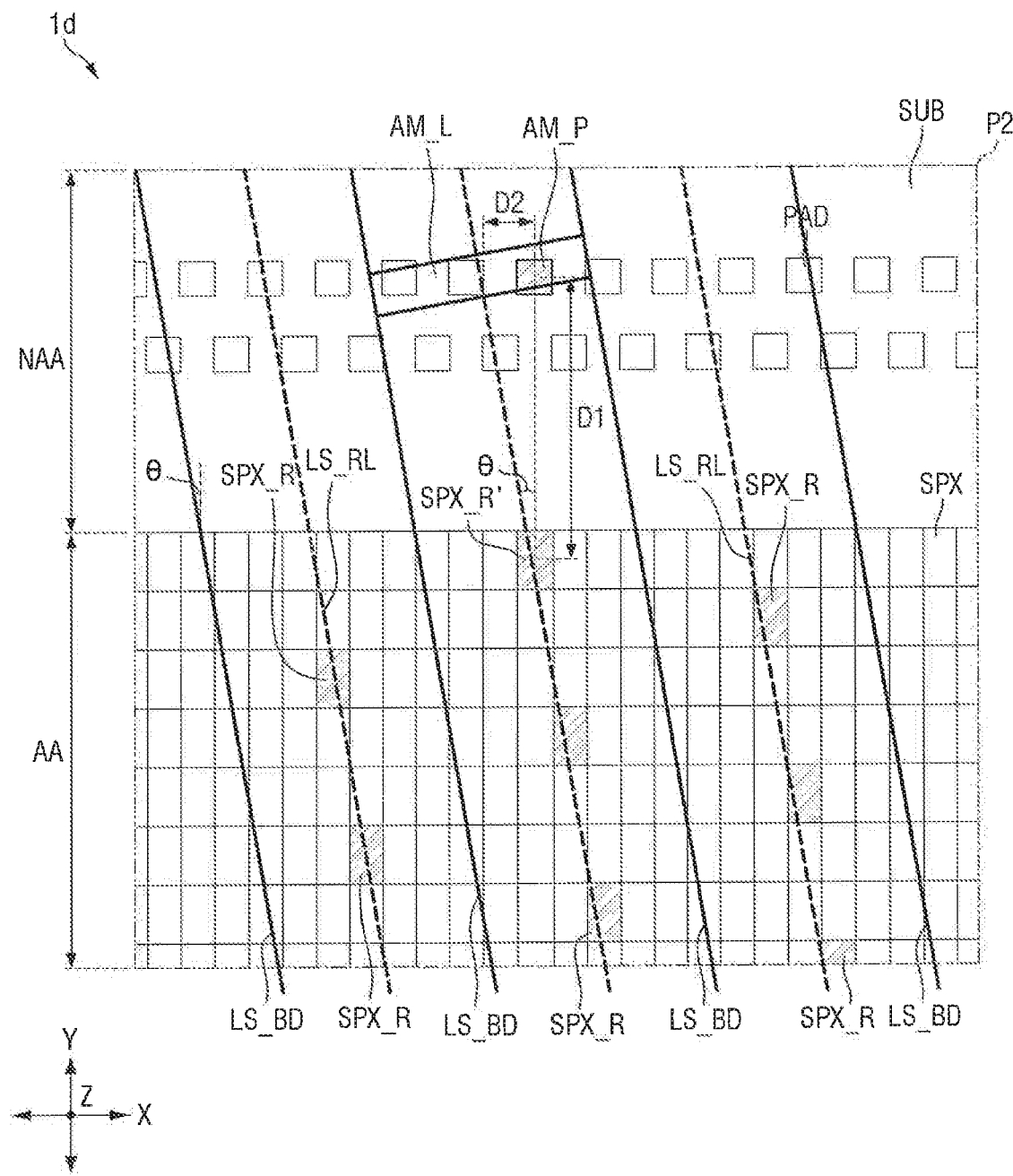
FIG. 9 is an enlarged plan view of portion "P2" in FIG. 8.
Figure 10:
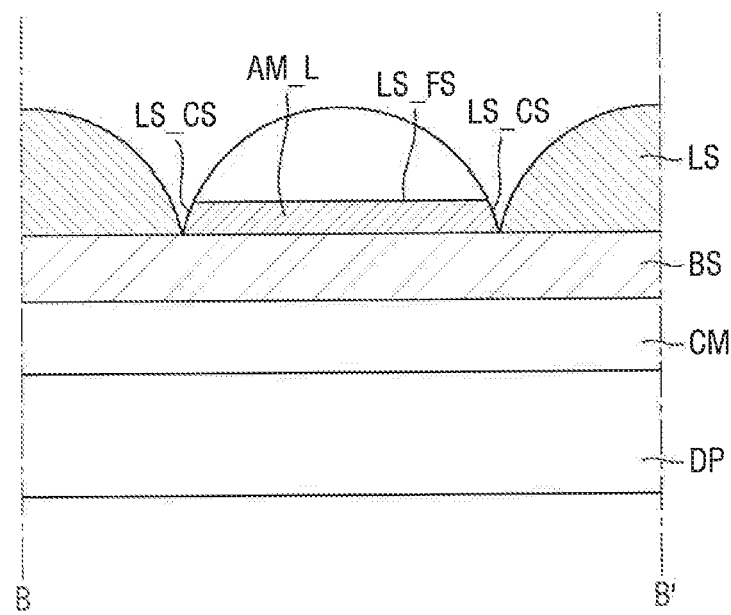
FIG. 10 is a cross-sectional view taken along line B-B' in FIG. 8.

FIG. 8 is a perspective view of a display device according to an embodiment of the present invention. FIG. 9 is an enlarged plan view of portion "P2" in FIG. 8. FIG. 10 is a cross-sectional view taken along line B-B' in FIG. 8.

Referring to FIGS. 8 to 10, unlike the embodiments of FIGS. 1 to 7, the second alignment mark AM_L may also be disposed on the plurality of lenses LS.

Referring to FIG. 8, the plurality of lenses LS may be disposed to cover the upper surface of the base member BS. For example, the plurality of lenses LS may completely cover the upper surface of the base member BS. In this case, the plurality of lenses LS may overlap not only the active region AA but also the inactive region NAA in the thickness direction. For example, unlike the embodiments of FIGS. 1 to 4, the second region NLR, in which the plurality of lenses LS are not disposed, may not exist. However, the present invention is not limited thereto, and for example, an edge portion of the optical member LAF overlapping the inactive region NAA may include a portion of the second region NLR.

Referring to FIGS. 8 and 9, similar to the embodiments of FIGS. 1 to 4, the second alignment mark AM_L may be disposed at the display device 1, for example, a middle portion of the long side, of the optical member LAF, extending in the first direction X. In this case, the second alignment mark AM_L may be disposed to overlap the inactive region NAA of the display panel DP in the thickness direction. However, the present invention is not limited thereto, and as shown in FIGS. 5 to 7, the second alignment mark AM_L may also be disposed at the corner portions of the optical member LAF and/or the short sides extending in the second direction Y. For example, the arrangement of the second alignment mark AM_L may vary.

Referring to FIG. 9, the second alignment mark AM_L may have an approximately rectangular shape in a plan view. In this case, a boundary of the second alignment mark AM_L may be disposed to be inclined in a direction crossing the first direction X and the second direction Y. In an embodiment of the present invention, the second alignment mark AM_L may have both short sides in one side direction that the lens LS extends and both long sides in the other side direction crossing the one side direction in a plan view, but a shape of the second alignment mark AM_L is not limited thereto. As described above, the one side direction is a direction inclined at the first angle θ with respect to the second direction Y in which columns of the plurality of sub-pixels SP1, SP2, and SP3 extend, and the other side direction may be a direction orthogonal to the one side direction.

The boundary of the second alignment mark AM_L may at least partially overlap the lens boundary LS_BD. For example, as shown in FIG. 9, both short sides of the second alignment mark AM_L may be disposed to overlap neighboring lens boundaries LS_BD, respectively. In this case, a width of the second alignment mark AM_L in the other side direction may be substantially the same as the width of the lens LS in the other side direction and/or the pitch at which the plurality of lenses LS are arranged. Accordingly, the second alignment mark AM_L may be more clearly recognized during the bonding process of the display panel DP and the optical member LAF.

The size of the second alignment mark AM_L may be larger than that of the first alignment mark AM_P. The size may refer to an area in a plan view. For example, a width in the first direction X of the first alignment mark AM_P may be smaller than a width in the first direction X and/or a width in one side direction of the second alignment mark AM_L, and a width in the second direction Y of the first alignment mark AM_P may be smaller than a width in the second direction Y and/or a width in the other side direction of the second alignment mark AM_L.

As shown in FIG. 9, a part of the first alignment mark AM_P may be disposed to overlap at least a part of the second alignment mark AM_L in the thickness direction in a plan view. However, the present invention is not limited thereto, and for example, the first alignment mark AM_P may be spaced apart to not overlap the second alignment mark AM_L in the thickness direction in a plan view.

Similar to the embodiments of FIGS. 1 to 4, the first alignment mark AM_P may be disposed to be spaced apart from the alignment reference pixel SPX_R' by the first distance D1 in the second direction Y. In this case, the center of the second alignment mark AM_L may be spaced apart from the center of the first alignment mark AM_P by the second distance D2 in the first direction X. The relationship between the first distance D1, the second distance D2, and the first angle θ may be substantially the same as or similar to those of the embodiments of FIGS. 1 to 4.

Referring to FIGS. 8, 9, and 10, the second alignment mark AM_L may be formed by removing at least a part of the lens LS disposed to overlap the first alignment mark AM_P in the thickness direction, among the plurality of lenses LS, and the second alignment mark AM_L may overlap the first alignment mark AM_P. As shown in FIG. 8, the second alignment mark AM_L may have a shape in which a part of the lens LS is recessed downward.

The second alignment mark AM_L may include a flat surface LS_FS. For example, as shown in FIG. 10, in a cross-sectional view, the second alignment mark AM_L may be a part of the lens LS in which the flat surface LS_FS parallel to the first direction X and the second direction Y is formed. The flat surface LS_FS may be parallel to the base member BS, the coupling member CM, and/or the display panel DP. The second alignment mark AM_L may further include at least one curved surface LS_CS connected to the flat surface LS_FS in a cross-sectional view, but the present invention is not limited thereto. As the second alignment mark AM_L includes the flat surface LS_FS, when the second alignment mark AM_L and the first alignment mark AM_P overlap each other, the first alignment mark AM_P may be recognized without distortion.

For example, the second alignment mark AM_L may be formed by completely removing a part of the lens LS disposed to overlap the first alignment mark AM_P in the thickness direction among the plurality of lenses LS. In this case, the flat surface LS_FS may be replaced with the upper surface of the base member BS. Further, the second alignment mark AM_L may be directly formed on a curved upper surface of the lens LS. In this case, the second alignment mark AM_L may not include the flat surface LS_FS.

The embodiments of FIGS. 8 to 10 are substantially the same as or similar to the embodiments of FIGS. 1 to 4 except for the second alignment mark AM_L, and thus redundant descriptions will be omitted below.

Figure 11:
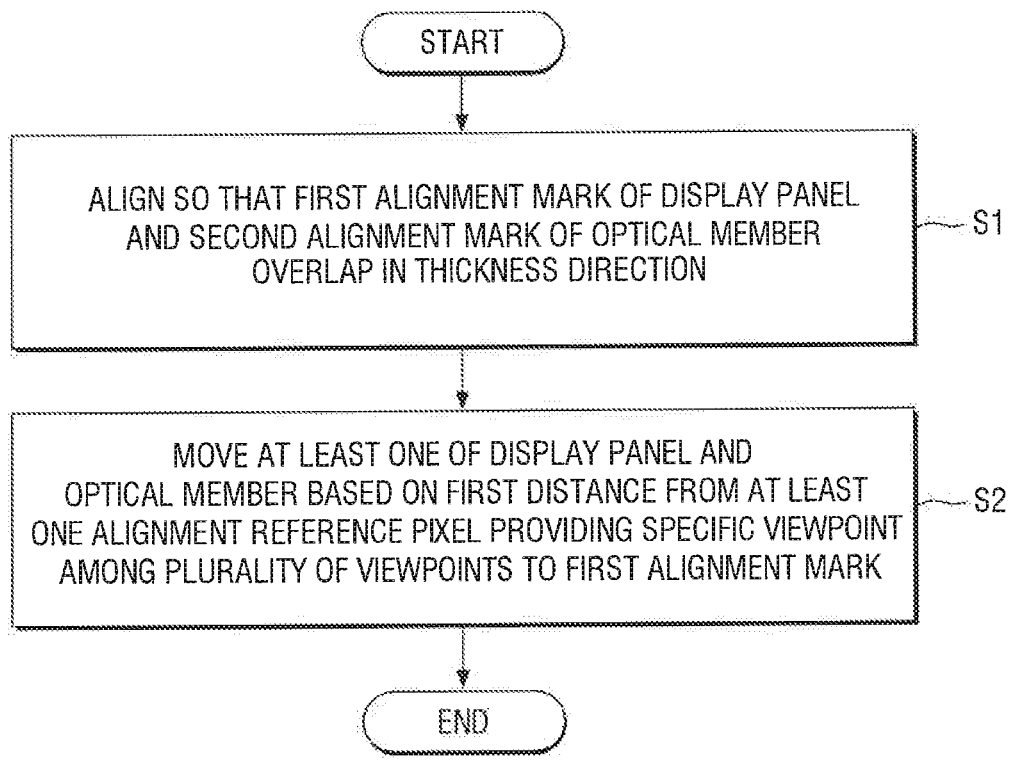
FIG. 11 is a flowchart of a method of manufacturing the display device according to an embodiment of the present invention.

FIG. 11 is a flowchart of a method of manufacturing the display device according to an embodiment of the present invention. FIGS. 12 to 15 are views illustrating operations of the method of manufacturing the display device according to an embodiment of the present invention.

A display device 1 manufactured by the following method of manufacturing the display device may be the display devices 1, 1a, 1b, and 1c of FIGS. 1 to 10, but the present invention is not limited thereto.

Referring to FIG. 11, the method of manufacturing the display device according to an embodiment may include an operation of arranging a first alignment mark AM_P of a display panel DP and a second alignment mark AM_L of an optical member LAF to overlap each other in the thickness direction (S1) and an operation of moving at least one of the display panel DP and the optical member LAF based on a first distance D1 from at least one alignment reference pixel SPX_R' providing a specific viewpoint among a plurality of viewpoints to the first alignment mark AM_P (S2).

However, the method of manufacturing the display device is not limited to the above example, and at least some of the operations may be omitted, or at least one other operation may be further included with reference to other descriptions of the present specification.

Hereinafter, the method of manufacturing the display device will be described in detail with reference to FIGS. 12 to 15.

Figure 12:
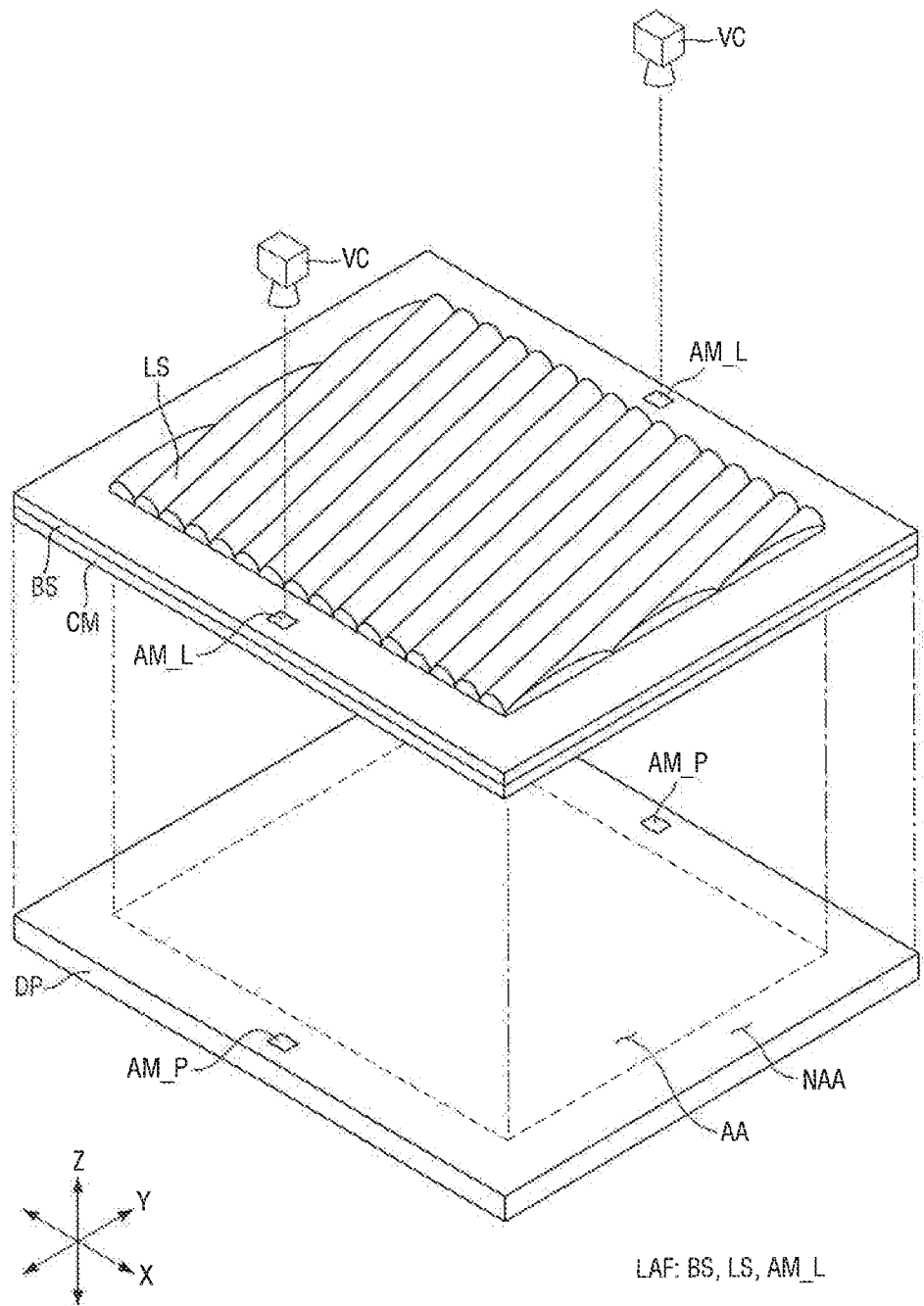
FIGS. 12, 13, 14 and 15 are views illustrating operations of the method of manufacturing the display device according to an embodiment of the present invention.

Referring to FIG. 12, the display panel DP and the optical member LAF may be prepared. The first alignment mark AM_P may be formed in the inactive region NAA of the display panel DP, and the second alignment mark AM_L may be formed in the second region NLR of the optical member LAF.

Referring to FIGS. 5 to 7, the position in which the second alignment mark AM_L is formed may vary.

Referring further to FIG. 8, the second alignment mark AM_L including the flat surface LS_FS may be formed on the lens LS of the optical member LAF and/or between the lenses LS.

In FIG. 12, a coupling member CM coupling the display panel DP and the optical member LAF to each other may be disposed on a lower surface of the optical member LAF, but the present invention is not limited thereto. For example, the coupling member CM may be disposed on an upper surface of the optical member LAF. In this case, the second alignment mark AM_L may be formed by a process of applying a resin on the base member BS and imprinting the resin, but the present invention is not limited thereto.

Figure 13:
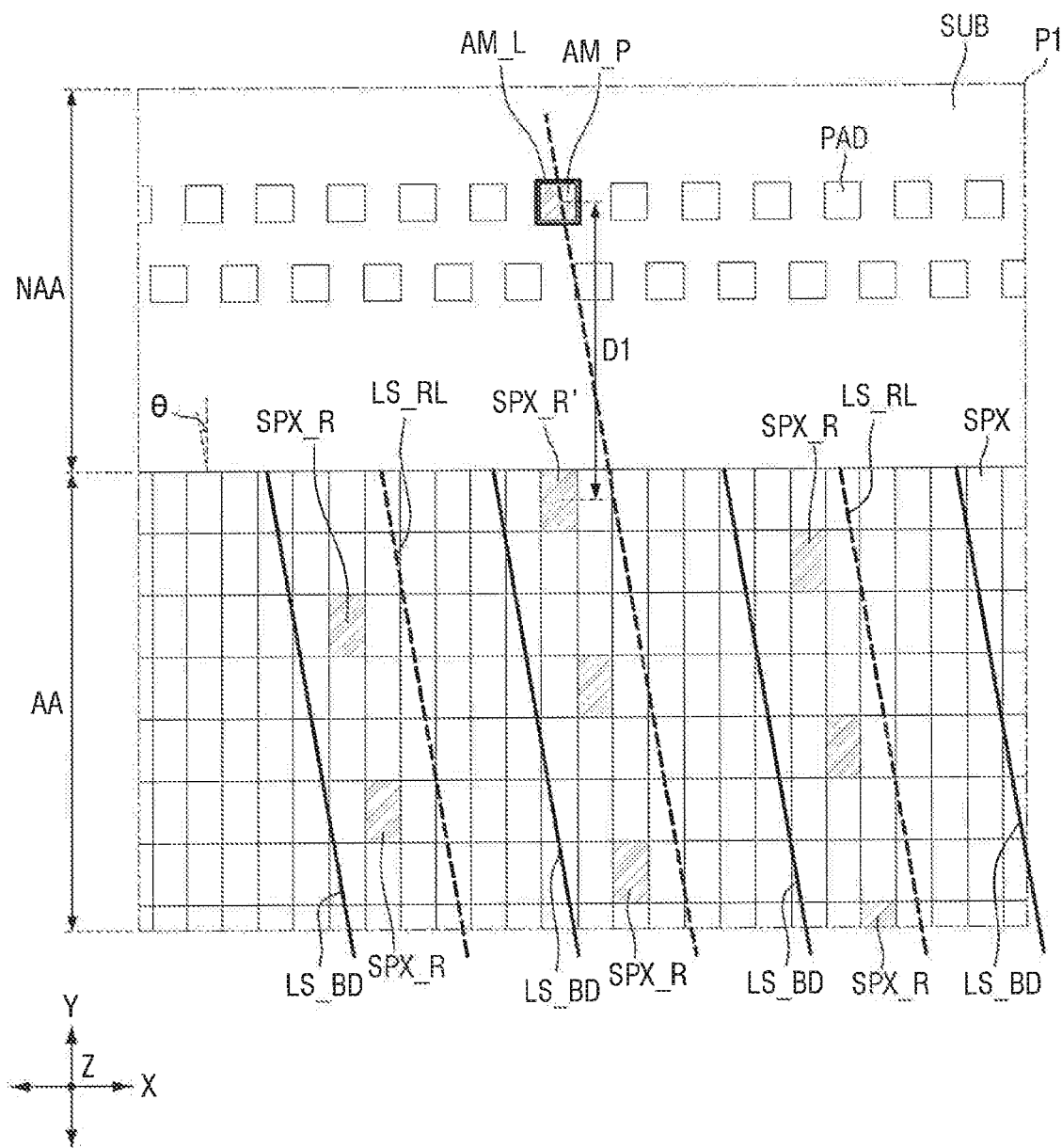

Referring to FIGS. 12 and 13, the display panel DP and the optical member LAF may be primarily aligned so that the first alignment mark AM_P and the second alignment mark AM_L overlap each other in the thickness direction. For example, the alignment may be performed based on relative positions of the first alignment mark AM_P and the second alignment mark AM_L recognized by at least one detector VC such as a vision camera.

As shown in FIG. 13, when the display panel DP and the optical member LAF are primarily aligned, the first alignment mark AM_P and the second alignment mark AM_L may be positioned so that the center of the first alignment mark AM_P and the center of the second alignment mark AM_L overlap each other in the thickness direction, respectively. In this case, both the first alignment mark AM_P and the second alignment mark AM_L may be spaced apart from the alignment reference pixel SPX_R' by the first distance D1. The first distance D1 may be a distance measured in the second direction Y in which rows (or, e.g., columns) of the plurality of sub-pixels SP1, SP2, and SP3 extend.

For example, when the display panel DP and the optical member LAF are primarily aligned, an edge of the display panel DP (active region) and an edge of the optical member LAF (first region LR) may not overlap each other in the thickness direction.

Figure 14:
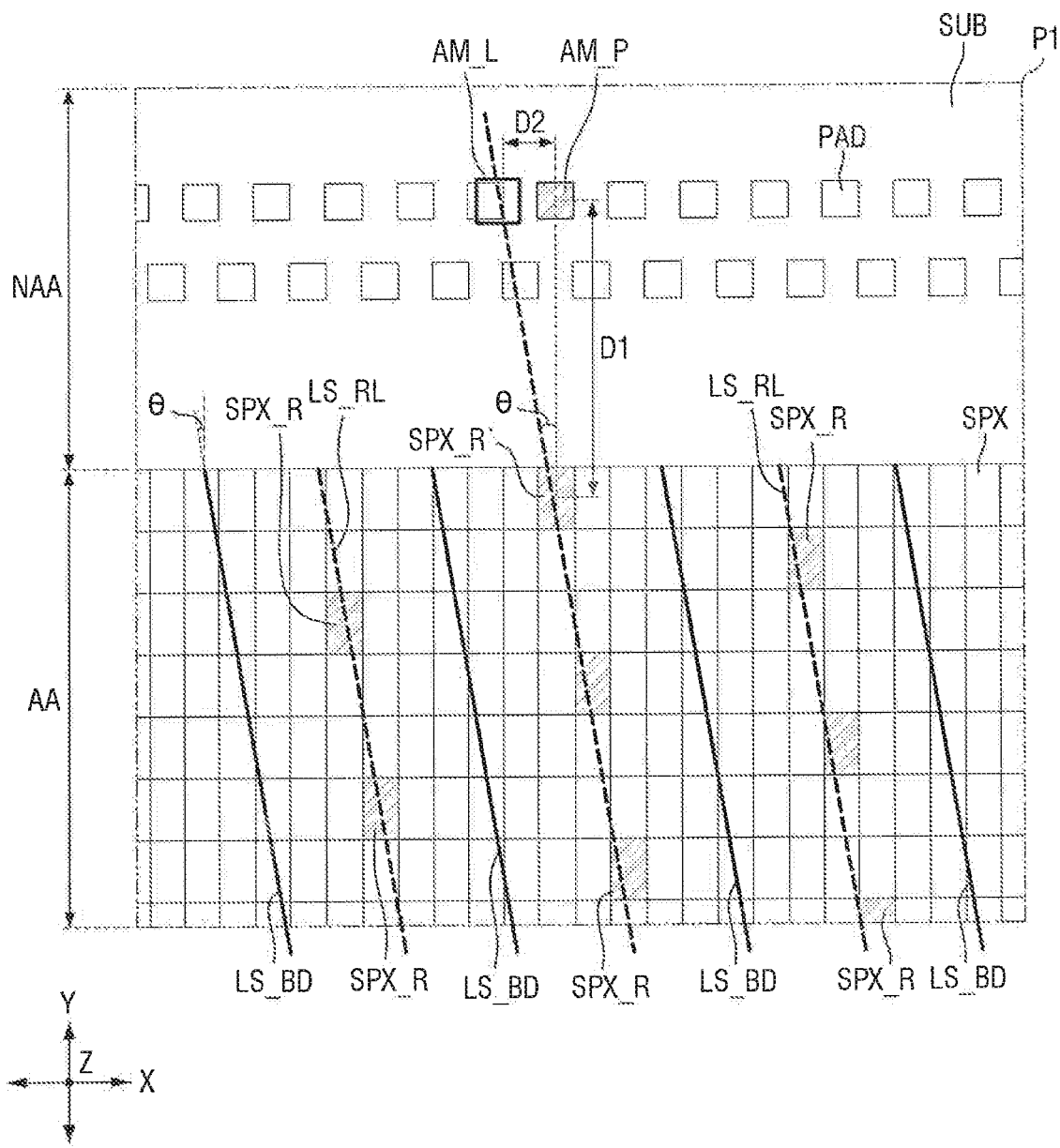

Referring to FIG. 14, the operation of moving at least one of the display panel DP and the optical member LAF may include an operation of spacing apart the center of the first alignment mark AM_P from the center of the second alignment mark AM_L by a second distance D2. For example, the center of the first alignment mark AM_P may be misaligned with the center of the second alignment mark AM_L by the second distance D2. The second distance D2 may be a distance measured in the first direction X in which columns (or, e.g., rows) of the plurality of sub-pixels SP1, SP2, and SP3 extend.

For example, the display panel DP and the optical member LAF may be secondarily aligned so that the plurality of reference viewpoint pixels SPX_R overlap the center line LS_RL of the lens LS in the thickness direction. To this end, the optical member LAF may be moved by the second distance D2 in the first direction X, for example, in a left direction of FIGS. 13 and 14, and accordingly, the second alignment mark AM_L may also be moved by the second distance D2 in the first direction X. In this case, the center of the second alignment mark AM_L may be spaced apart from the center of the first alignment mark AM_P by the second distance D2.

As described above in FIG. 4, in an embodiment of the present invention, the first distance D1, the second distance D2, and the first angle θ may satisfy the following relationship.

$$D2 = D1 \times \tan\theta$$

According to a comparative example, the display panel DP and the optical member LAF may be aligned by driving and turning on the entire display panel DP, and using a three-dimensional pattern image passing through the optical member LAF. In such a conventional method, in a case of the display device 1 having a large screen, a camera having a very high resolution was used, and thus, there was a problem in that the precision of the alignment may be lowered. In addition, when the display panel DP and the optical member LAF are bonded together, the display panel DP should be driven and turned on every time, and thus there was a problem in that a process may be complicated and a process time may be long.

In addition, in the method of manufacturing the display device according to an embodiment of the present invention, it is not necessary to drive and turn on the entire display panel DP as in the comparative example (e.g., the conventional method), and a position of the camera is also independent of a screen size of the display device 1, and thus, the process may be simplified, and the process time may be reduced. In addition, in the method of manufacturing the display device according to an embodiment of the present invention, the alignment accuracy may be greatly increased compared to the conventional method by aligning positions of the lens LS and the sub-pixel based on the sub-pixel providing a specific viewpoint.

Figure 15:
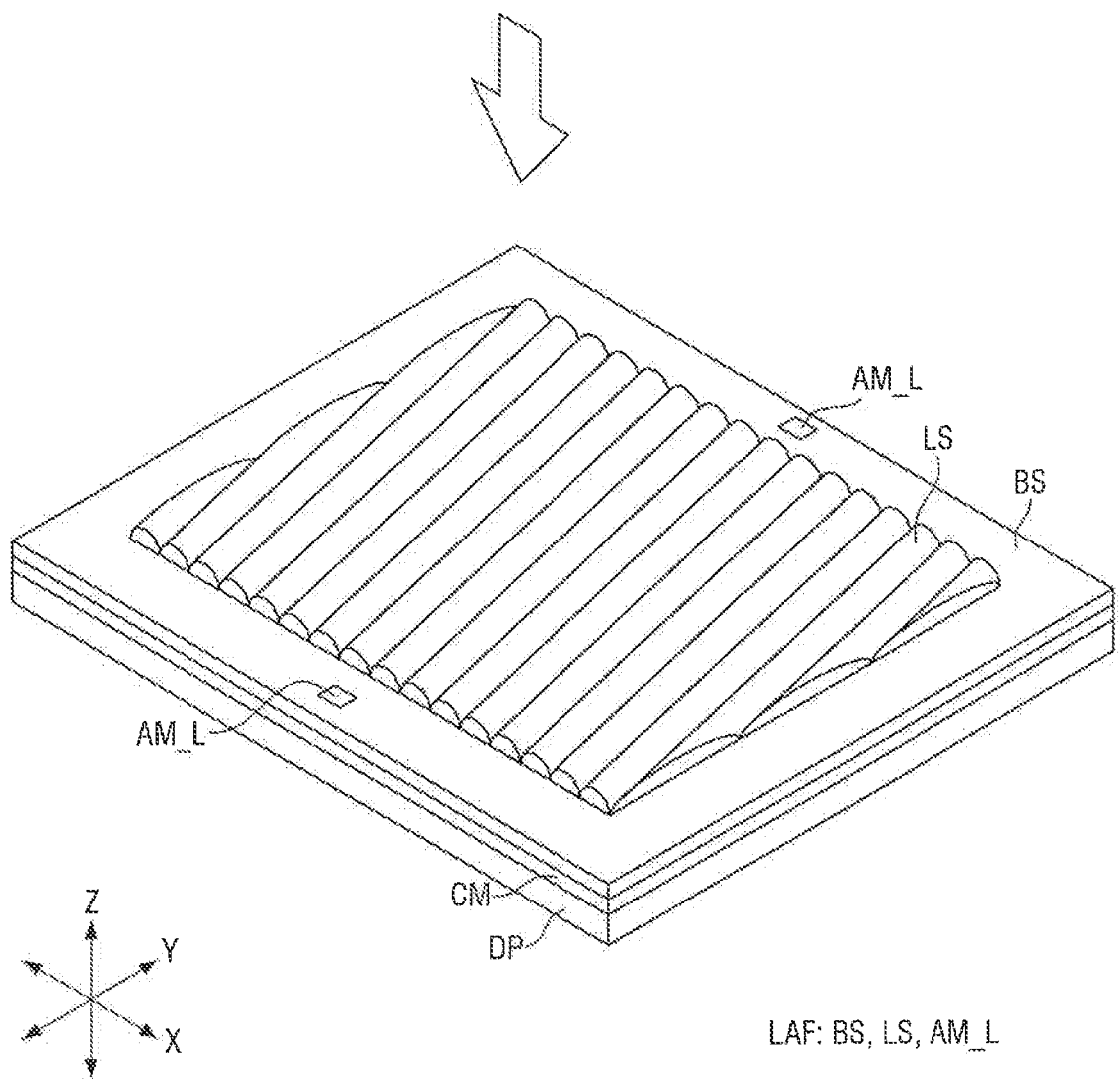

Referring to FIG. 15, the method of manufacturing the display device may further include an operation of bonding the display panel DP and the optical member LAF. Referring further to FIGS. 4 and 14, as described above, when the display panel DP and the optical member LAF are bonded together, the reference viewpoint pixel SPX_R may be positioned within a preset error range from the center line LS_RL of the lens LS. The preset error range may be less than or equal to half of the width in the first direction X and/or the other side direction of the reference viewpoint pixel SPX_R (the sub-pixels SP1, SP2, and SP3). For example, the preset error range may be about 5 μm, but the present invention is not limited thereto.

A display device and a method of manufacturing the display device according to an embodiment can have increased alignment accuracy.

Effects according to the embodiments of the present invention are not limited by the contents illustrated above, and more various effects are included in the present specification.

While the present invention has been described with reference to the embodiments thereof, it will be understood by those of ordinary skill in the art that various changes in form and detail may be made thereto without departing from the spirit and scope of the present invention.

What is claimed is:

1. A display device comprising:
a display panel including an active region, an inactive region disposed adjacent to the active region, and a first alignment mark, wherein a plurality of sub-pixels is disposed in the active region, and the first alignment mark is positioned at a first distance in a first direction from an alignment reference pixel disposed adjacent to a boundary of the active region; and
an optical member including a plurality of lenses and a second alignment mark, wherein the plurality of lenses is disposed to be inclined at a first angle with respect to a direction in which the plurality of sub-pixels is arranged, and wherein the second alignment mark is positioned at the first distance in the first direction from the alignment reference pixel and is positioned at a second distance in a second direction, crossing the first direction, from the first alignment mark,
wherein the second alignment mark is misaligned with the first alignment mark,
wherein the second alignment mark is disposed on the plurality of lenses, wherein the second alignment mark is disposed on a lens, among the plurality of lenses, overlapping the alignment reference pixel.

2. The display device of claim 1, wherein the display device provides N viewpoints for providing a stereoscopic image, and the alignment reference pixel is a sub-pixel, among the plurality of sub-pixels, that displays an image for a (N+1)/2th viewpoint, wherein "N" is a natural number.

3. The display device of claim 1, wherein the optical member includes a base member including a first region and a second region, wherein the plurality of lenses is disposed in the first region, wherein the plurality of lenses is not disposed in the second region, and wherein the second alignment mark is disposed in the second region of the base member.

4. The display device of claim 1, wherein the second distance is larger than a preset error range, and the preset error range is a distance from a center line that bisects a lens of the plurality of lenses in an extension direction of the lens of the plurality of lenses to a center of the alignment reference pixel.

5. The display device of claim 1, wherein the second distance is larger than a width of the sub-pixel.

6. The display device of claim 1, wherein the first alignment mark is disposed in the inactive region.

7. The display device of claim 1, wherein the first alignment mark is electrically connected to the alignment reference pixel.

8. The display device of claim 1, wherein the first alignment mark is a pad for driving the alignment reference pixel.

9. The display device of claim 1, wherein the second distance is determined by the first distance and the first angle.

10. The display device of claim 1, wherein the first distance and the second distance are measured based on a center of the alignment reference pixel, a center of the first alignment mark, and a center of the second alignment mark.

11. The display device of claim 1, wherein the first alignment mark does not overlap the second alignment mark in a thickness direction.

12. The display device of claim 1, wherein at least a part of the first alignment mark overlaps at least a part of the second alignment mark in a thickness direction.

13. A method of manufacturing a display device, the method comprising:
arranging a first alignment mark of a display panel and a second alignment mark of an optical member to overlap each other in a thickness direction such that a center of the first alignment mark is aligned with a center of the second alignment mark; and
moving at least one of the display panel or the optical member based on a first distance from a first alignment reference pixel to the first alignment mark, wherein the first alignment reference pixel provides a specific viewpoint among a plurality of viewpoints, wherein the moving of at least one of the display panel or the optical member includes misaligning the center of the first alignment mark with the center of the second alignment mark by a second distance, after aligning the center of the first alignment mark with the center of the second alignment mark, wherein the center of the first alignment mark is not realigned with the center of the second alignment mark,
wherein the second alignment mark is disposed on a plurality of lenses of the optical member,
wherein the second alignment mark is disposed on a lens, among the plurality of lenses, overlapping the first alignment reference pixel.

14. The method of claim 13, wherein the first distance is a distance measured in a first direction, and the second distance is a distance measured in a second direction crossing the first direction.

15. The method of claim 13, wherein the second distance is larger than a preset error range, and the preset error range is a distance from a center line that bisects a lens of the optical member in an extension direction of the lens to a center of the first alignment reference pixel.

16. The method of claim 13, wherein the first alignment reference pixel is a sub-pixel, among a plurality of sub-pixels, that displays an image for a (N+1)/2th viewpoint, wherein the plurality of sub-pixels displays N view images corresponding to N viewpoints, respectively, wherein "N" is a natural number.

17. The method of claim 13, further comprising
bonding the display panel and the optical member to each other.

* * * * *